P. S. DUFFY.
SPOKE SOCKET.
APPLICATION FILED NOV. 2, 1911.

1,026,572.

Patented May 14, 1912.

Witnesses
William A. Smith.
C. C. Hines.

Inventor
Patrick S. Duffy.

By Victor J. Evans
Attorney

UNITED STATES PATENT OFFICE.

PATRICK S. DUFFY, OF BARRE, VERMONT.

SPOKE-SOCKET.

1,026,572. Specification of Letters Patent. Patented May 14, 1912.

Application filed November 2, 1911. Serial No. 658,157.

*To all whom it may concern:*

Be it known that I, PATRICK S. DUFFY, a citizen of the United States, residing at Barre, in the county of Washington and State of Vermont, have invented new and useful Improvements in Spoke-Sockets, of which the following is a specification.

This invention relates to spoke sockets, for connecting the spokes with the rim of a vehicle wheel, the object of the invention being to provide a simple, inexpensive and efficient construction of device of this character for rigidly and firmly connecting the spoke and rim and which permits of the ready and convenient connection and disconnection of the parts as occasion may require.

The invention consists of the features of construction, combination and arrangement of parts, hereinafter fully described and claimed, reference being had to the accompanying drawings, in which:—

Figure 1:
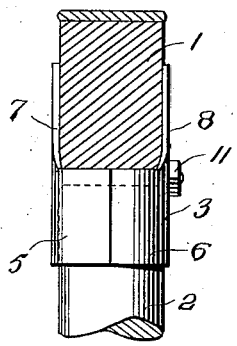
Figure 2:
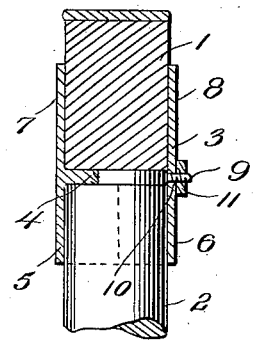
Figure 3:
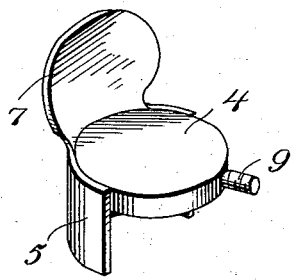
Figure 4:
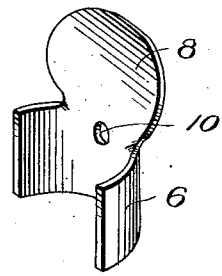

Figure 1 is a cross section through the rim of a vehicle wheel showing the application of the invention, the spoke and socket appearing in elevation. Fig. 2 is a similar view through the rim, spoke and socket taken on a line centrally through said socket. Fig. 3 is a perspective view of one of the parts of the socket. Fig. 4 is a perspective view of the other part thereof.

Referring to the drawing, 1 designates the rim and 2 one of the spokes of a vehicle wheel, connected by my improved socket 3. The socket 3 comprises a disk or head 4, of circular or elliptical form, and a pair of clip members 5 and 6, which head or disk serves as an abutment against which the rim seats and the outer end of the spoke bears. The said clip members 5 and 6 are each of semi-circular or semi-elliptical form and project inwardly from the head or disk to inclose the end of the spoke and form a socket for the reception of the latter. The member 5 is fixed to the disk, either by forming it integral therewith or welding it thereto and is provided with an outwardly projecting substantially circular or elliptical ear 7, while the member 6 is formed independently of the disk or head for ready connection and disconnection, and is provided with a similar ear 8. The two ears 7 and 8 are adapted to bear against the opposite sides of the rim and to form jaws to clamp the same to the spoke.

The head or disk is provided with a bolt or projection 9 projecting laterally therefrom and adapted to pass through an opening 10 in the member 6, said bolt or projection being threaded to receive a clamping nut 11, whereby the member 6 is adapted to be secured in position to form with the member 5 the complete socket to receive the spoke end and hold the ears or jaws in clamping position. This construction adapts the parts of the socket to be conveniently and quickly applied and removed to connect or disconnect the spoke and rim with or from each other. When the parts are in applied position the spoke and rim will be firmly coupled and, if desired, any suitable means may be employed to hold the nut against retrograde rotation.

From the foregoing description, the construction and mode of use of my improved spoke socket will be readily understood, and it will be seen that the invention provides a device of this character which is simple of construction and capable of being inexpensively made, and which is effective for its intended purpose.

Having thus described the invention, what I claim as new is:

A spoke socket comprising a disk or head, a partially circular socket forming member fixed to one side of said disk or head, a complemental socket-forming member adapted to be arranged at the opposite side of the disk or head and having an opening therein, a threaded projection integral with the disk or head and adapted to pass through said opening, a nut adapted to engage said projection, and clamping ears or jaws carried by said socket-forming members to bear against opposite sides of the wheel rim.

In testimony whereof I affix my signature in presence of two witnesses.

PATRICK S. DUFFY.

Witnesses:
WILLIAM MERCER,
JAMES T. KUNFICK.

Copies of this patent may be obtained for five cents each, by addressing the "Commissioner of Patents, Washington, D. C."